US009734055B2

(12) United States Patent
Hidaka

(10) Patent No.: US 9,734,055 B2
(45) Date of Patent: Aug. 15, 2017

(54) INFORMATION PROCESSING APPARATUS AND ACCESS CONTROL METHOD

(71) Applicant: FUJITSU LIMITED, Kawasaki-shi, Kanagawa (JP)

(72) Inventor: Akihito Hidaka, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 134 days.

(21) Appl. No.: 14/548,643

(22) Filed: Nov. 20, 2014

(65) Prior Publication Data
US 2015/0081991 A1 Mar. 19, 2015

Related U.S. Application Data

(63) Continuation of application No. PCT/JP2012/063460, filed on May 25, 2012.

(51) Int. Cl.
*G06F 12/121* (2016.01)
*G06F 12/06* (2006.01)
*G11B 20/18* (2006.01)

(52) U.S. Cl.
CPC .......... *G06F 12/063* (2013.01); *G06F 12/121* (2013.01); *G11B 20/1889* (2013.01);
(Continued)

(58) Field of Classification Search
CPC .... G06F 12/08; G06F 12/023; G06F 12/0253; G06F 12/0223; G06F 12/0246;
(Continued)

(56) References Cited

U.S. PATENT DOCUMENTS 5,075,804 A * 12/1991 Deyring ................. G11B 19/00
360/49
5,235,585 A * 8/1993 Bish .................... G11B 20/1833
369/53.17
(Continued)

FOREIGN PATENT DOCUMENTS

JP 02-239472 9/1990
JP 06-076480 3/1994
(Continued)

OTHER PUBLICATIONS

International Search Report and Written Opinion of the International Searching Authority (Form PCT/ISA/210, Form PCT/ISA/237), mailed in connection with PCT/JP2012/063460 on Jun. 19, 2012 (6 pages).

*Primary Examiner* — Midys Rojas
*Assistant Examiner* — Khoa D Doan
(74) *Attorney, Agent, or Firm* — Fujitsu Patent Center

(57) ABSTRACT

Upon receipt of an instruction to access a logical address of a storage medium, an information processing apparatus controls access to its corresponding physical address of the storage medium. A management unit manages mapping between a continuous series of logical addresses and discrete physical addresses skipping a predetermined number of replacement areas. A controller identifies to which physical address the received logical address is mapped, and controls access to the storage medium using the identified physical address. When a defect occurs in a storage area indicated by a physical address, the information processing apparatus remaps its corresponding logical address to a replacement area adjacent to the defective physical address.

18 Claims, 16 Drawing Sheets

(52) U.S. Cl.
CPC .... *G06F 2212/206* (2013.01); *G06F 2212/69* (2013.01); *G11B 20/1883* (2013.01); *G11B 2020/1896* (2013.01); *G11B 2220/2516* (2013.01)

(58) Field of Classification Search
CPC ............ G11B 20/1883; G11B 20/1886; G11B 2020/1896; G11B 2020/1893; G11B 20/1889
See application file for complete search history.

(56) References Cited

U.S. PATENT DOCUMENTS

| | | | | |
|---|---|---|---|---|
| 5,319,627 | A * | 6/1994 | Shinno | G11B 20/1883 369/30.07 |
| 5,367,652 | A * | 11/1994 | Golden | G06F 3/0601 360/72.1 |
| 5,532,992 | A * | 7/1996 | Funamoto | G11B 20/1883 369/47.14 |
| 5,541,903 | A * | 7/1996 | Funahashi | G11B 20/1883 369/30.04 |
| 5,802,584 | A * | 9/1998 | Kool | G06F 3/0608 360/48 |
| 5,835,930 | A * | 11/1998 | Dobbek | G11B 20/1883 711/202 |
| 5,844,911 | A * | 12/1998 | Schadegg | G11B 20/1883 714/42 |
| 5,848,438 | A * | 12/1998 | Nemazie | G11B 20/1252 360/48 |
| 6,025,966 | A * | 2/2000 | Nemazie | G11B 20/1252 360/53 |
| 6,249,884 | B1 * | 6/2001 | Joo | G11B 20/1883 711/112 |
| 6,272,085 | B1 | 8/2001 | Maeda | |
| 6,301,644 | B1 * | 10/2001 | Andoh | G11B 20/1883 711/112 |
| 6,738,924 | B1 * | 5/2004 | Williams | G11B 20/1883 714/27 |
| 6,868,511 | B2 * | 3/2005 | Ko | G11B 20/1258 714/710 |
| 7,143,309 | B2 * | 11/2006 | Yoshida | G11B 20/1883 365/200 |
| 7,472,223 | B1 * | 12/2008 | Ofer | G06F 11/1662 711/112 |
| 7,752,491 | B1 * | 7/2010 | Liikanen | G06F 11/2087 714/6.13 |
| 8,953,265 | B1 * | 2/2015 | Ma | G11B 27/36 360/31 |
| 8,959,281 | B1 * | 2/2015 | Malina | G06F 12/0246 711/103 |
| 2003/0154206 | A1 * | 8/2003 | Kanai | G06F 3/0608 |
| 2004/0091238 | A1 * | 5/2004 | Ono | G11B 20/10 386/248 |
| 2004/0128581 | A1 * | 7/2004 | Yoshida | G11B 20/1883 714/6.13 |
| 2005/0025450 | A1 * | 2/2005 | Ono | G11B 20/10527 386/288 |
| 2006/0031710 | A1 * | 2/2006 | Jo | G06F 12/0246 714/5.1 |
| 2006/0153026 | A1 * | 7/2006 | Blacquiere | G06F 3/0605 369/47.1 |
| 2006/0181992 | A1 * | 8/2006 | Blacquiere | G11B 20/1217 369/53.17 |
| 2006/0181994 | A1 * | 8/2006 | Blacquiere | G11B 20/1883 369/53.17 |
| 2006/0230330 | A1 * | 10/2006 | Ijtsma | G11B 20/1883 714/766 |
| 2007/0168689 | A1 * | 7/2007 | Blacquiere | G11B 20/1883 714/4.4 |
| 2007/0220194 | A1 * | 9/2007 | Ijtsma | G11B 20/00086 711/4 |
| 2008/0005449 | A1 * | 1/2008 | Lou | G06F 12/0292 711/103 |
| 2008/0155317 | A1 * | 6/2008 | Kim | G11C 29/76 714/6.13 |
| 2008/0239548 | A1 * | 10/2008 | Paul | G11B 19/048 360/75 |
| 2009/0300082 | A1 * | 12/2009 | Chen | G06F 12/023 |
| 2013/0019049 | A1 * | 1/2013 | Yeh | G06F 12/0246 711/103 |
| 2013/0188276 | A1 * | 7/2013 | Kashiwagi | G11B 20/1217 360/75 |

FOREIGN PATENT DOCUMENTS

| | | |
|---|---|---|
| JP | 06-110619 | 4/1994 |
| JP | 10-301721 | 11/1998 |
| JP | 2004-103127 | 4/2004 |
| JP | 2004-185709 | 7/2004 |
| WO | 98/36414 | 8/1998 |

\* cited by examiner

50 LBA MANAGEMENT TABLE

| DEFECTIVE LBA | REPLACEMENT COUNT |
|---|---|
| #0 | 1 |
| #10000 | 1 |
| #12345 | 1 |

FIG. 8

INFORMATION PROCESSING APPARATUS AND ACCESS CONTROL METHOD

CROSS-REFERENCE TO RELATED APPLICATION

This application is a continuation application of International Application PCT/JP2012/063460 filed on May 25, 2012 which designated the U.S., the entire contents of which are incorporated herein by reference.

FIELD

The embodiments discussed herein relate to information processing apparatuses and access control methods.

BACKGROUND

Magnetic disk devices are widely used as high-speed and high-capacity storage media. These devices employ the logical block addressing (LBA) as a scheme for mapping a linear logical address space to physical sectors of disk media, so that a host can specify the locations of read and write data by using LBA addresses.

Some physical sectors on a magnetic disk may be or may become defective. Upon detection of a defective sector, the magnetic disk device remaps its corresponding LBA address to a different physical sector pooled in a previously secured substitution area. This change in the LBA mapping isolates and hides the defective sector, thereby contributing to an improved reliability of data retention.

See, for example, Japanese Laid-open Patent Publications No. 10-301721 and No. 2004-103127.

It is noted that the substitution area is located away from the physical sectors originally mapped to the logical address space. The foregoing change in the LBA mapping results in a loss of continuity of mapped physical sectors. This means that sequential access to the disk device would no longer be "sequential" in terms of the movement of magnetic heads, and thus the performance of such access would be degraded.

SUMMARY

According to an aspect of the invention, there is provided an information processing apparatus including a memory and one or more processors configured as follows. The memory is configured to store information about mapping between a continuous series of logical addresses and discrete physical addresses located at predetermined intervals in a storage medium. The one or more processors are configured to perform a procedure including: identifying a logical address corresponding to a physical address of a defective area found in the storage medium, and shifting the mapping of the identified logical address to an alternative physical address adjacent to the physical address of the defective area; and controlling access to a storage area at a physical address corresponding to a specified logical address, based on the stored information about the mapping.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 8 illustrates an example of an LBA management table of the second embodiment;

DESCRIPTION OF EMBODIMENTS

Hereinafter, embodiments of the present invention will be described in detail with reference to the accompanying drawings.

[First Embodiment]

Figure 1:
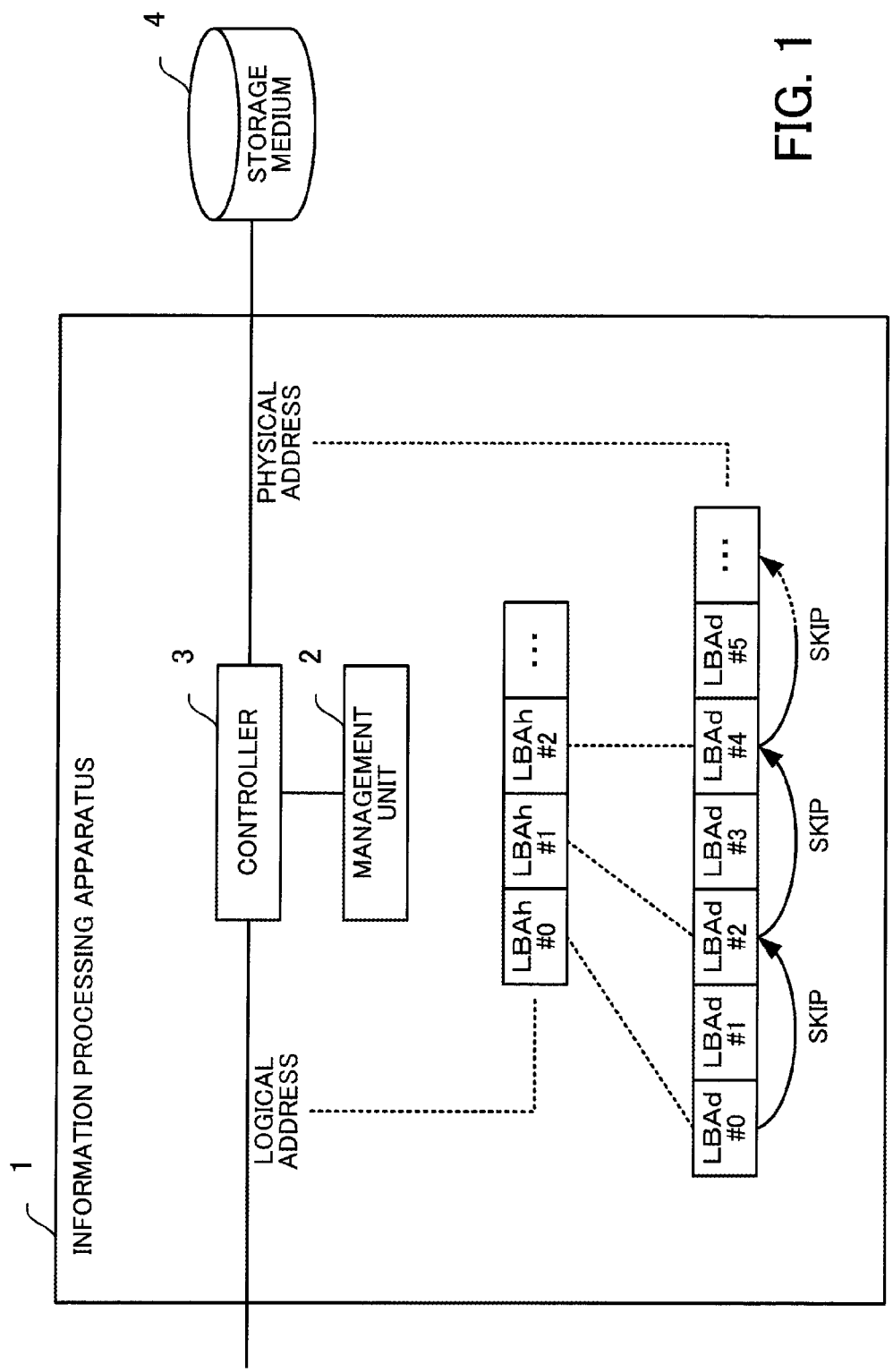
FIG. 1 illustrates a configuration example and processing example of an information processing apparatus of a first embodiment.

First, an information processing apparatus of a first embodiment is described using FIG. 1. FIG. 1 illustrates a configuration example and processing example of the information processing apparatus of the first embodiment.

Upon receipt of an instruction to access a logical address (LBAh) of a storage medium 4, an information processing apparatus 1 controls access to a physical address (LBAd) of the storage medium 4 corresponding to the logical address (LBAh).

Hereinafter, a logical address which the information processing apparatus 1 receives is represented by "LBAh", while a physical address which the information processing apparatus 1 specifies on the storage medium 4 is represented by "LBAd".

The information processing apparatus 1 includes a management unit 2 and a controller 3. The management unit 2 manages the mapping between a continuous series of logical addresses on the storage medium 4 and discrete physical addresses each skipping a predetermined number of replacement areas on the storage medium 4.

The physical address is an address that may uniquely identify a storage area which the storage medium 4 includes. For example, when the storage medium 4 is an HDD (Hard Disk Drive), the physical address is information that may uniquely identify a physical sector (storage area). The physical address is sequentially given to each storage area as follows: LBAd#0, LBAd#1, LBAd#2, and so on, for example.

The logical address is an apparent address of the storage medium 4. The logical address is sequentially given to each storage area as follows: LBAh#0, LBAh#1, LBAh#2, and so on, for example. Logical addresses and physical addresses have one-to-one correspondence, so that a logical address may identify a physical address associated with the logical address.

Logical addresses correspond to physical addresses separated by a predetermined number of replacement areas. That is, in every interval between two physical addresses corresponding to two continuous logical addresses, there are a predetermined number of replacement areas.

In the example of FIG. 1, a logical address LBAh#0 corresponds to a physical address LBAd#0, a logical address LBAh#1 corresponds to a physical address LBAd#2, and a logical address LBAh#2 corresponds to a physical address LBAd#4. Between physical address LBAd#0 and physical address LBAd#2, there is a physical address LBAd#1 that is not associated with a logical address. Between physical address LBAd#2 and physical address LBAd#4, there is a physical address LBAd#3 having no mapping with a logical address. Physical address LBAd#1 is an area secured as the replacement area of physical address LBAd#0. Physical address LBAd#3 is an area secured as the replacement area of physical address LBAd#2.

A replacement area is an area prepared for replacement of a storage area for a logical address in the case where a defect is found in its corresponding physical address. Note that the information processing apparatus 1 may secure a needed replacement area by setting an appropriate skip width as seen in FIG. 1.

The controller 3 receives an instruction to access a logical address. The controller 3 identifies the physical address associated with the received logical address, based on the mapping managed by the management unit 2. The controller 3 controls access to the storage medium 4 using the identified physical address.

Thus, when a defect occurs in an area indicated by a physical address, the information processing apparatus 1 remaps the logical address that has been associated with the defective physical address to a replacement area adjacent to the defective physical address. Because the arrangement order of logical addresses matches the arrangement order of physical addresses associated with the logical addresses even when such a replacement takes place, the information processing apparatus 1 may retain the continuity of access to the storage medium 4. Accordingly, the information processing apparatus 1 may perform sequential access even when a defective area is found on the storage medium 4, thus suppressing a decrease in the access performance.

[Second Embodiment]

Figure 2:
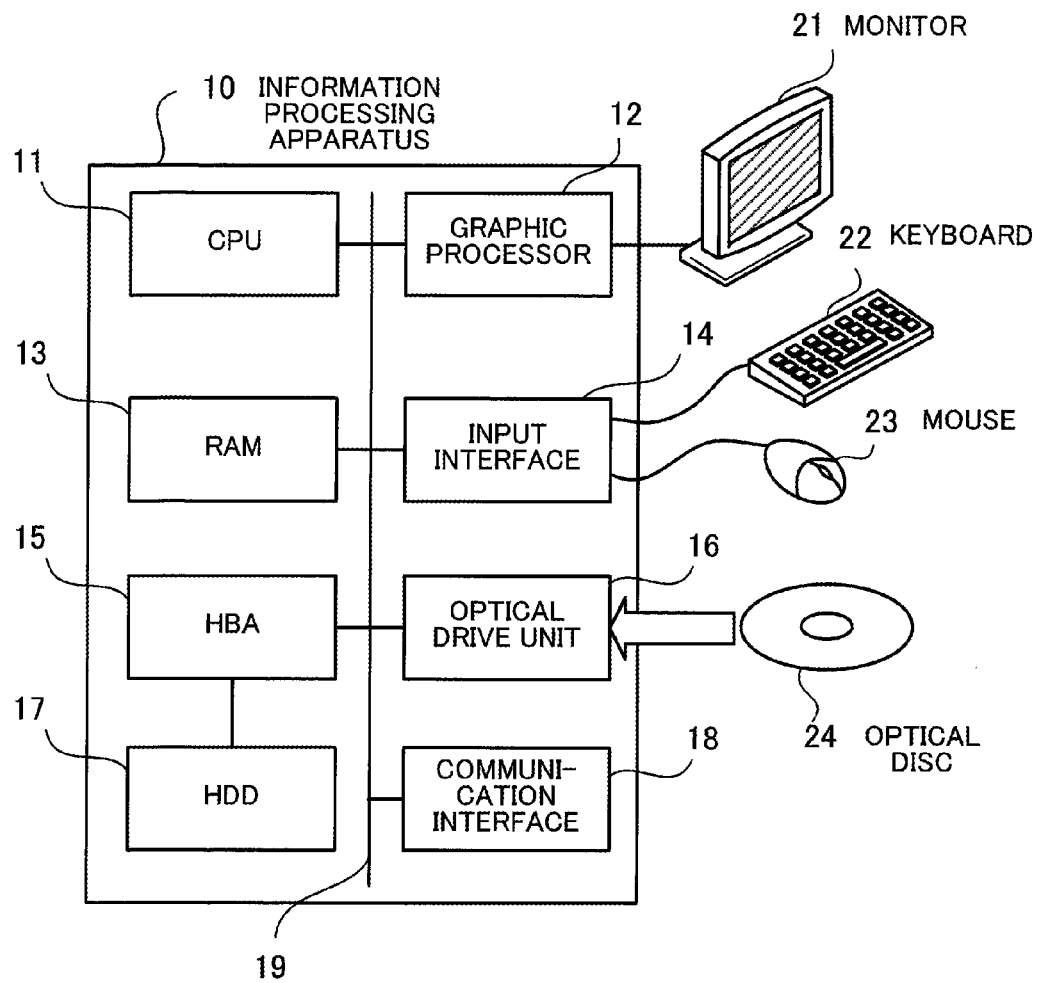
FIG. 2 illustrates a hardware configuration example of an information processing apparatus of a second embodiment.

Next, an information processing apparatus of a second embodiment is described using FIG. 2. FIG. 2 illustrates a hardware configuration example of the information processing apparatus of the second embodiment.

An information processing apparatus 10 includes a storage device and an accessible computer, for example. The information processing apparatus 10 connects a plurality of peripheral devices. The whole information processing apparatus 10 is controlled by a CPU (Central Processing Unit) 11. A RAM (Random Access Memory) 13 and a plurality of peripheral devices are connected to the CPU 11 via a bus 19.

The RAM 13 is used as the main storage unit of the information processing apparatus 10. At least part of the program of an OS (Operating System) and an application program which the CPU 11 executes are temporarily stored in the RAM 13. Moreover, various types of data needed for processing by the CPU 11 are stored in the RAM 13.

The peripheral devices connected to the bus 19 include a graphic processor 12, an input interface 14, an HBA (Host Bus Adapter) 15, an optical drive unit 16, and a communication interface 18.

A monitor 21 is connected to the graphic processor 12. The graphic processor 12 displays an image on a screen of the monitor 21 in accordance with an instruction from the CPU 11.

A keyboard 22 and a mouse 23 are connected to the input interface 14. The input interface 14 transmits a signal sent from the keyboard 22 or the mouse 23 to the CPU 11.

The HBA 15 provides a hardware interface and a software interface, and mediates the access to the HDD 17 (storage device) made by the CPU 11 (host). For example, the HBA 15 has a function to control the storage device compliant with SCSI (Small Computer System Interface). Note that, the HBA 15 is not limited to the HBA that is bus-connected through SCSI, but may be an HBA that is bus-connected via a bus interface of PCI (Peripheral Component Interconnect) or the like. Moreover, the HBA 15 may be an HBA that is bus-connected to a mother board having the CPU 11 mounted therein via an interface of an expansion slot or the like, or may be an HBA that is mounted on a mother board having the CPU 11 mounted therein and is bus-connected.

The HDD 17 magnetically writes and reads data on its platters (magnetic disks). The HDD 17 is used as a secondary storage unit of the information processing apparatus 10. The program of an OS, an application program, and various types of data are stored in the HDD 17. Note that, a semiconductor memory, such as a flash memory, may be used as the secondary storage unit. Moreover, the HDD 17 may be an HDD that is externally connected to the information processing apparatus 10.

The optical drive unit 16 reads the data recorded on the optical disc 24 using a laser beam or the like. The optical disc 24 is a portable storage medium on which data is recorded so as to be readable by reflection of light. The examples of the optical disc 24 include a DVD (Digital Versatile Disc), a DVD-RAM, a CD-ROM (Compact Disc Read Only Memory), and a CD-R (Recordable)/RW (Re-Writable).

The communication interface 18 is connected to a non-illustrated network. The communication interface 18 transmits and receives data to and from another computer or telecommunication device via a network.

With such a hardware configuration, the processing function of the embodiment may be realized.

Figure 3:
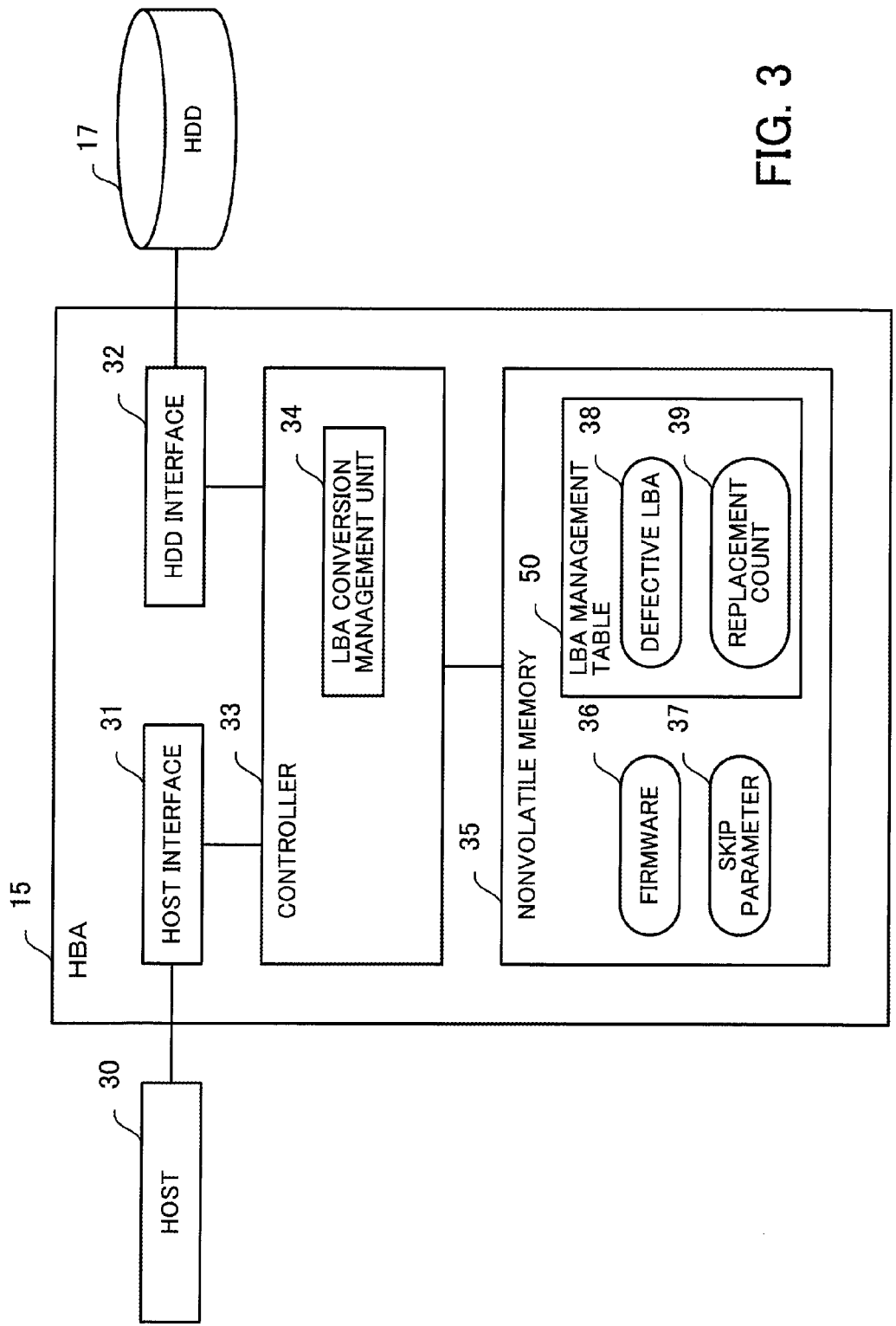
FIG. 3 illustrates a configuration example of the information processing apparatus of the second embodiment.

Next, an HBA of a second embodiment is described using FIG. 3. FIG. 3 illustrates a configuration example of an information processing apparatus of the second embodiment.

The HBA 15 mediates the access to the HDD 17 made by the host 30. The HBA 15 receives from the host 30 a request to access the HDD 17 using a logical address, and makes the access to the HDD 17 using a physical address associated with the logical address. Hereinafter, a logical address which the host 30 specifies to the HBA 15 represented by "LBAh", while a physical address which the HBA 15 specifies to the HDD 17 is represented by "LBAd".

Note that, the Host 30 is a request source that requests the HBA 15 for the access to the HDD 17, and corresponds to the CPU 11 in the information processing apparatus 10. The processing of the host 30 is realized by the CPU 11 executing an OS, for example.

The HBA 15 includes a host interface 31, an HDD interface 32, a controller 33, an LBA conversion management unit 34, and a nonvolatile memory 35. The host interface 31 provides a hardware interface and a software interface for connecting the HBA 15 and the host 30. The HDD interface 32 provides a hardware interface and a software interface for connecting the HBA 15 and the HDD 17.

The controller 33 includes an LBA conversion management unit 34. The nonvolatile memory 35 stores therein firmware 36, a skip parameter 37, and an LBA management table 50. Each entry of the LBA management table 50 retains a defective LBA 38 and its replacement count 39.

The controller 33 includes a non-illustrated CPU and integrally controls the HBA 15. The processing of the controller 33 is realized by the CPU of the controller 33 executing the firmware 36.

The controller 33 mutually converts LBAh and LBAd with reference to the LBA management table 50. The LBA conversion management unit 34 generates and updates the LBA management table 50. The LBA conversion management unit 34 generates the LBA management table 50 in the initialization processing, and updates the LBA management table 50 upon detection of a failure in access to the HDD 17.

In the initialization processing, the controller 33 allocates LBAd's at constant intervals to a plurality of continuous LBAh's. The controller 33 secures a replacement area including as many LBAd's as the number given by the skip parameter 37, between an LBAd allocated to one LBAh and another LBAd allocated to the next LBAh. Consequently the number of storage areas available to a user in the HDD 17 is reduced to approximately 1/(1+skip parameter 37). For example, when the skip parameter is "1", the number of storage areas available to a user in the HDD 17 is reduced to approximately ½.

Upon detection of a failure in access to the HDD 17, the controller 33 dissolves the mapping between an LBAd indicative of an area (defective area), in which an access failure has occurred, and an LBAh associated with this LBAd. The controller 33 registers a new entry of defective LBA 38 to record the LBAh allocated to the LBAd at which an access failure has occurred. The controller 33 also registers a new entry of replacement count 39 to record the number of times of dissolving the mapping with an LBAd as an access failure. In place of the LBAd at which an access failure has occurred, the controller 33 generates a new mapping with a replacement area continuous to this LBAd to update the LBA management table 50.

The controller 33 may obtain a new mapping for the mutual conversion between an LBAh and an LBAd, based on the defective LBA 38 and replacement count 39.

As described above, even when the mapping between an LBAh and an LBAd is updated, the arrangement direction of the LBAd of the allocation destination when the LBAh is incremented or decremented will not change, and therefore the HBA 15 may retain the continuity in access to the HDD 17.

The retention of the sequential access characteristic with respect to the HDD 17 reduces the probability of the occurrence of a seek operation. For example, in a typical hard disk of 2.5 inches and 10 krpm, in writing data, a seek time takes approximately 8 ms at full stroke and approximately 4 ms on average, and a rotational latency takes approximately 6 ms at the maximum and approximately 3 ms on an average. In such a hard disk, due to the occurrence of a seek operation, the seek time of approximately 14 ms occurs at the maximum. Even when defective sectors accumulate due to a long-term operation, the HBA 15 may retain the sequential access characteristic with respect to the HDD 17. Then, the HBA 15 reduces the seek time by retention of the sequential access characteristic with respect to the HDD 17. The HBA 15 enables to retain the high speed access performance of the HDD 17 over a long period of time, by a reduction in the seek time.

Figure 4:
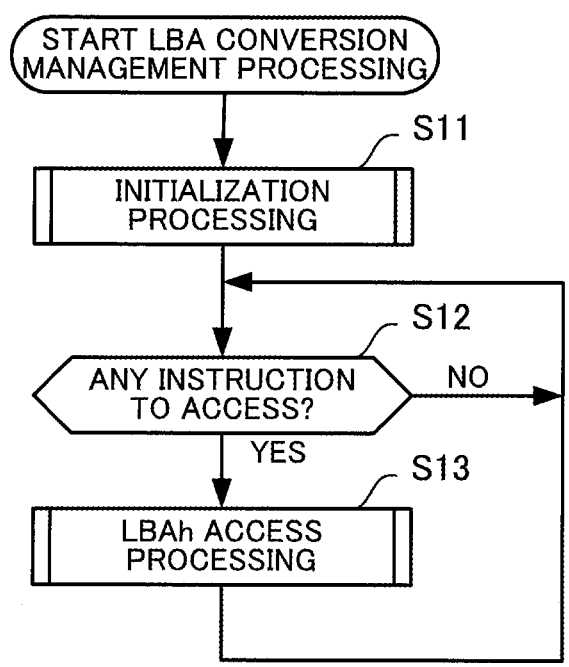
FIG. 4 is a flowchart of LBA conversion management processing of the second embodiment.

Next, the LBA conversion management processing executed by the controller 33 of the HBA 15 of the second embodiment is described using FIG. 4. FIG. 4 is a flowchart of the LBA conversion management processing of the second embodiment.

The LBA conversion management processing is for managing the mutual conversion between LBAh and LBAd. The controller 33 executes the LBA conversion management processing by activating the HBA 15.

[Step S11] The controller 33 executes initialization processing. The detail of the initialization processing is described later using FIG. 5.

[Step S12] The controller 33 determines whether or not it has received an instruction to access the HDD 17 from the host 30. The controller 33 proceeds to Step S13 when having received the instruction to access the HDD 17 from the host 30, and waits for the access instruction when not having received the access instruction.

[Step S13] The controller 33 executes LBAh access processing. The detail of the LBAh access processing is described later using FIG. 7 and FIG. 8.

Figure 5:
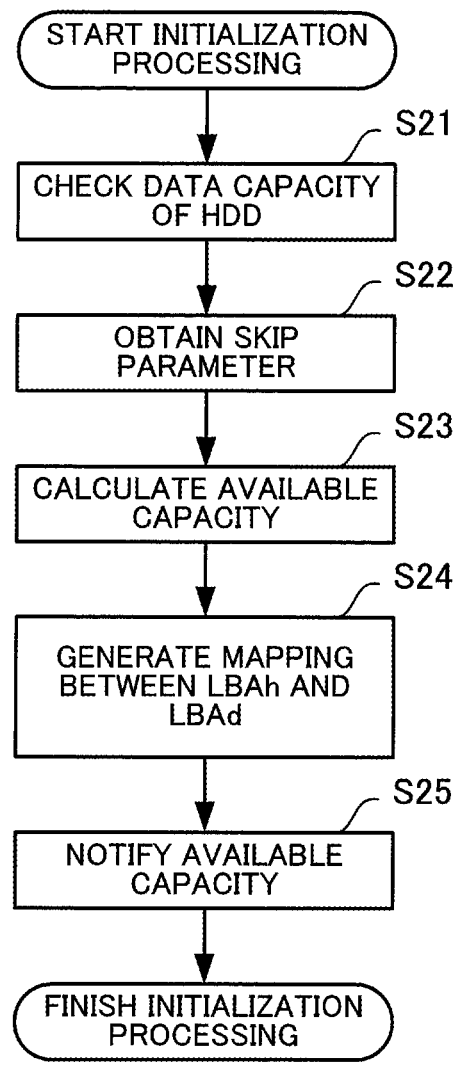
FIG. 5 is a flowchart of initialization processing of the second embodiment.

Next, the initialization processing executed by the controller 33 of the HBA 15 of the second embodiment is described using FIG. 5. FIG. 5 is a flowchart of the initialization processing of the second embodiment.

The initialization processing is to establish the mapping between LBAh and LBAd. The controller 33 executes the initialization processing in Step S12 of the LBA conversion management processing.

[Step S21] The controller 33 checks the data capacity of the HDD 17.

[Step S22] The controller 33 obtains the skip parameter 37. The skip parameter 37 is an integer of zero or more and has a value set at an appropriate time. The skip parameter 37 may be input from an input device, such as the keyboard 22 or the mouse 23, or received from an external device via the communication interface 18.

[Step S23] The controller 33, when having secured a needed management area and substitution area on a magnetic disk and further having secured a replacement area (storage area) specified by the skip parameter 37 for each storage area, calculates the capacity available to a user. Note that the management area is an area which is provided at the head of a magnetic disk and which records the needed information related to the magnetic disk. The substitution area is a storage area to be substituted when a failure occurs in one storage area including the replacement area thereof.

[Step S24] The controller 33 matches the arrangement order of LBAh's (first addresses) with the arrangement order of LBAd's (second addresses) corresponding to the LBAh's and establishes mapping between LBAh and LBAd. Thus, the controller 33 may match the arrangement order of LBAh's with the arrangement order of LBAd's associated with the LBAh's and establish mapping between LBAh and LBAd.

Note that the detail of the generation of the mapping between LBAh and LBAd is described later.

[Step S25] The controller 33 notifies the host 30 of the available capacity of the HDD 17, and finishes the initialization processing.

Note that the controller 33 may set the skip parameter 37 in plurality. For example, the controller 33 may set a different skip parameter 37 for each magnetic disk when the HDD 17 includes a plurality of magnetic disks. Moreover, the controller 33 may set a different skip parameter 37 for each area on a magnetic disk. Thus, the controller 33 may set the skip parameter 37 in accordance with the occurrence characteristic of a failure of the HDD 17 (storage medium).

Figure 6:
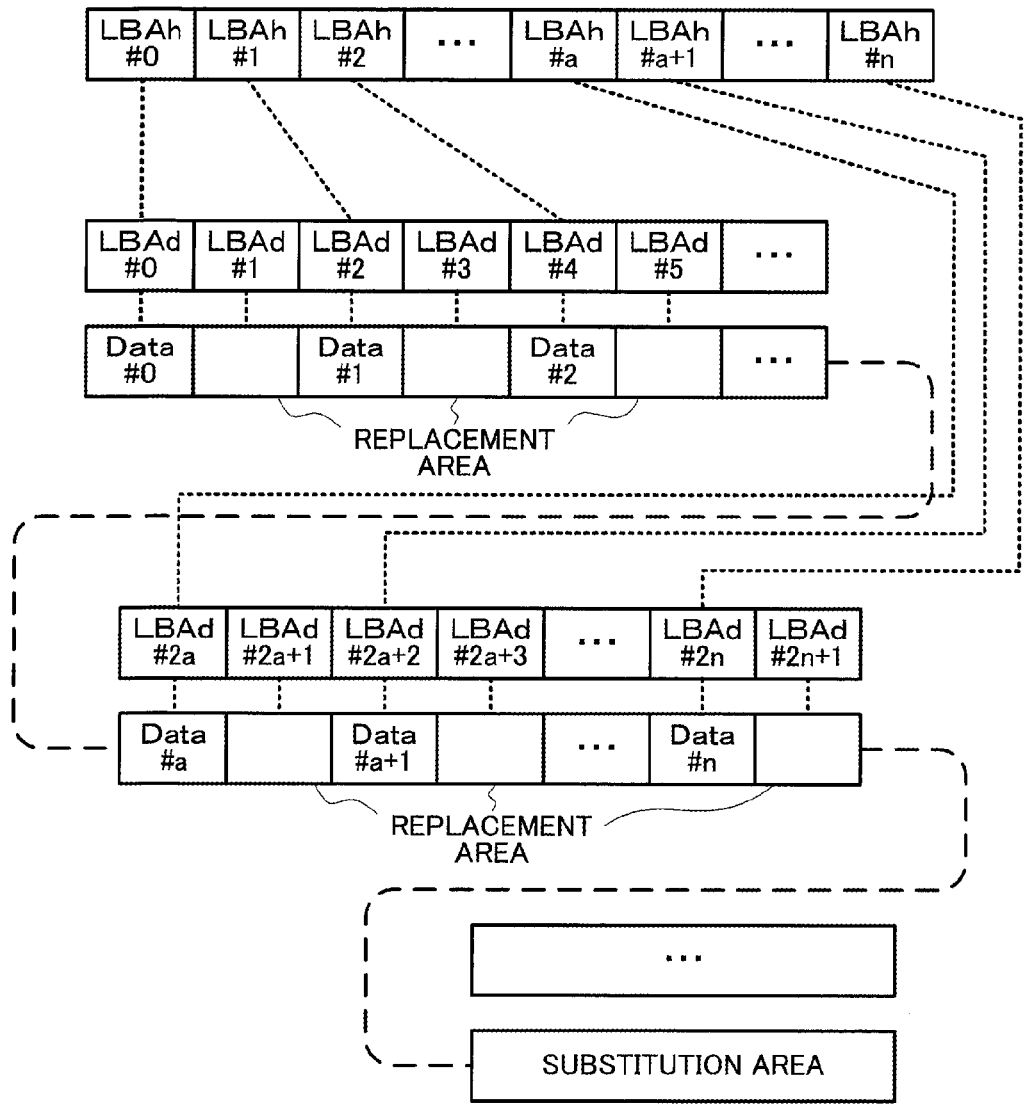
FIG. 6 illustrates an example of an LBA arrangement of the second embodiment.

Next, the mapping between LBAh and LBAd, which is established by the controller 33 of the HBA 15 of the second embodiment in the initialization processing when the skip parameter is "1", is described using FIG. 6. FIG. 6 illustrates an example of the LBA arrangement of the second embodiment.

The following description assumes that the HBA 15 specifies LBAd to the HDD 17 as sector numbers sequentially given to sectors on a magnetic disk. Alternatively, LBAd may be a logical address set by the HDD 17. In this case, the HDD 17 allocates a physical address indicative of a sector number to each of LBAd's such that the physical address will either increase or decrease as the LBAd increases.

The HDD 17 includes a non-illustrated management area, storage areas from LBAd#0 to LBAd#2n+1, and a substitution area with an appropriate size. The mapping between LBAh and LBAd in the HDD 17 illustrates the case when the skip parameter is "1".

Since the skip parameter is "1" in the storage areas from LBAd#0 to LBAd#2n+1, a Data area and a replacement area are alternately set as follows: Data#0, a replacement area, Data#1, a replacement area, and so on.

LBAh#0 to LBAh#n alternately correspond to LBAd#0 to LBAd#2n, such as LBAd#0 to LBAh#0 and LBAd#2 to LBAh#1. The arrangement order from LBAh#0 to LBAh#n matches the arrangement order from LBAd#0 to LBAd#2n.

That is, when i is an integer from 0 to n, LBAh#i corresponds to LBAd#2i, and LBAd#2i+1 not mapped to LBAh#i is a replacement area therefor.

Thus, upon receipt of a request to access continuous logical addresses (LBAh) from the host 30, the HBA 15 may perform access to physical areas that are arranged in one direction with respect to the HDD 17. Moreover, because the recording density of data decreases by alternately setting a Data area and a replacement area, the HDD 17 may reduce the risk of data loss caused by the occurrence of a defective sector or the like.

Figure 7:
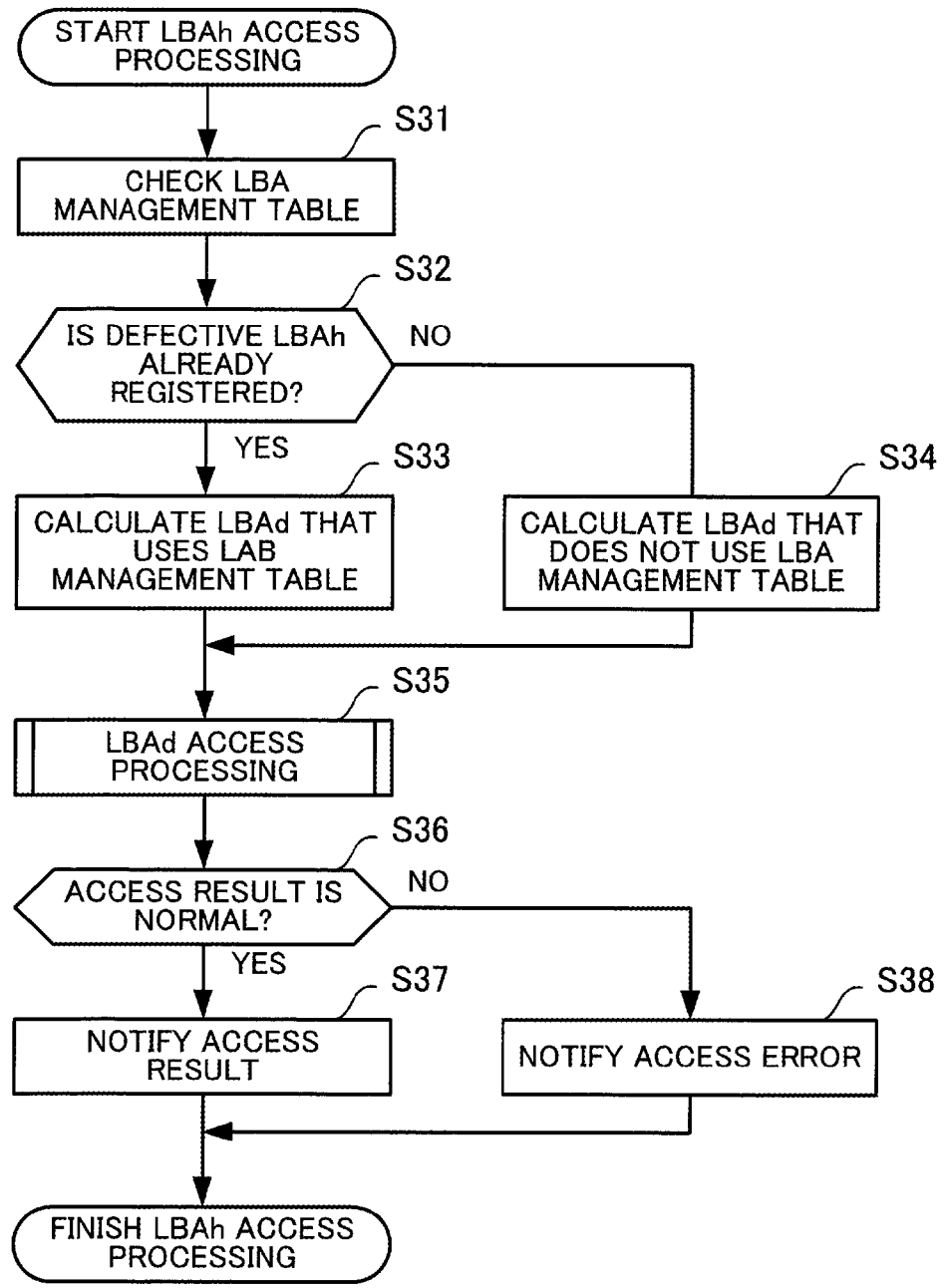
FIG. 7 is a flowchart of LBAh access processing of the second embodiment.

Next, the LBAh access processing executed by the controller 33 of the HBA 15 of the second embodiment is described using FIG. 7 and FIG. 8. FIG. 7 is a flowchart of the LBAh access processing of the second embodiment. FIG. 8 illustrates an example of the LBA management table of the second embodiment.

The LBAh access processing is to respond to a request for access to the HDD 17 from the host 30 by using LBAh. The controller 33 executes the LBAh access processing in Step S13 of the LBA conversion management processing.

[Step S31] The controller 33 checks the LBA management table 50. As illustrated in FIG. 8, the LBA management table 50 retains a defective LBA and its corresponding replacement count. The defective LBA is the LBAh corresponding to the area in which a defective has been detected. For example, LBAh#i is marked as a defective LBA when a defect is detected in LBAd#2i corresponding to LBAh#i, and LBAh#i is remapped to LBAd#2i+1, the replacement area for LBAd#2i. The replacement count indicates how many times the mapping between LBAh and LBAd has been changed.

[Step S32] The controller 33 determines whether or not a logical address (LBAh), to which an access request has been made, is registered with the LBA management table 50 as a defective LBA. The controller 33 proceeds to Step S33 when a logical address (LBAh), to which an access request has been made, is registered with the LBA management table 50 as a defective LBA, while when it is not yet registered as a defective LBA, the controller 33 proceeds to Step S34. For example, upon receipt of a request for access to LBAh#1000 to LBAh#1010, the controller 33 determines that there is no defective LBA registered with the LBA management table 50. Moreover, upon receipt of a request for access to LBAh#12340 to LBAh#12350, the controller 33 determines that there is a defective LBA (LBAh#12345) registered with the LBA management table 50.

[Step S33] The controller 33 calculates a physical address (LBAd) corresponding to a logical address (LBAh) by using the LBA management table 50. In calculating a physical address (LBAd), the controller 33 obtains a physical address (LBAd) that is associated with a logical address (LBAh) in the initialization processing, the logical address (LBAh) being registered as a defective LBA with the LBA management table 50 (or the controller 33 may calculate a physical address (LBAd) using a calculation formula). The controller 33 may calculate a physical address (LBAd) to be newly associated, by performing address shift with respect to the obtained physical address (LBAd) by the replacement count.

For example, when LBAh#12345 is registered as a defective LBA, the controller 33 obtains LBAd#24690 (=12345× 2) corresponding to LBAh#12345 from LBAd=LBAh×2. The controller 33 calculates LBAd#24691 (=12345×2+1) by address-shifting LBAd#24690 by one with reference to the replacement count of "1".

Note that the controller 33 may calculate the amount of address shifting from a predetermined shift amount per replacement and the current replacement count indicating how many times the address has been shifted.

[Step S34] The controller 33 calculates a physical address (LBAd) corresponding to a logical address (LBAh) without using the LBA management table 50. In calculating a physical address (LBAd), the controller calculates a physical address (LBAd) that is associated with a logical address (LBAh) in the initialization processing. For example, the controller 33 calculates LBAd#200 (=100×2) corresponding to LBAh#100 from LBAd=LBAh×2.

[Step S35] The controller 33 executes LBAd access processing. The LBAd access processing is an act of making access to LBAd in the HDD 17. The detail of the LBAd access processing is described later using FIG. 9.

[Step S36] The controller 33 determines whether or not a processing result of the LBAd access processing is normal. The controller 33 proceeds to Step S37 when the processing result of the LBAd access processing is normal, while when the processing result of the LBAd access processing is not normal, the controller 33 proceeds to Step S38.

[Step S37] The controller 33 notifies the host 30 of the result of accessing the HDD 17 using LBAd, via the host interface 31. The access result is, for example, a completion report on the writing for writing to the HDD 17, or is read data for reading from the HDD 17. The controller 33 notifies the host 30 of the access result and finishes the LBAh access processing.

[Step S38] The controller 33 notifies the host 30 of an access error to the HDD 17 using LBAd, via the host interface 31 and finishes the LBAh access processing.

Figure 9:
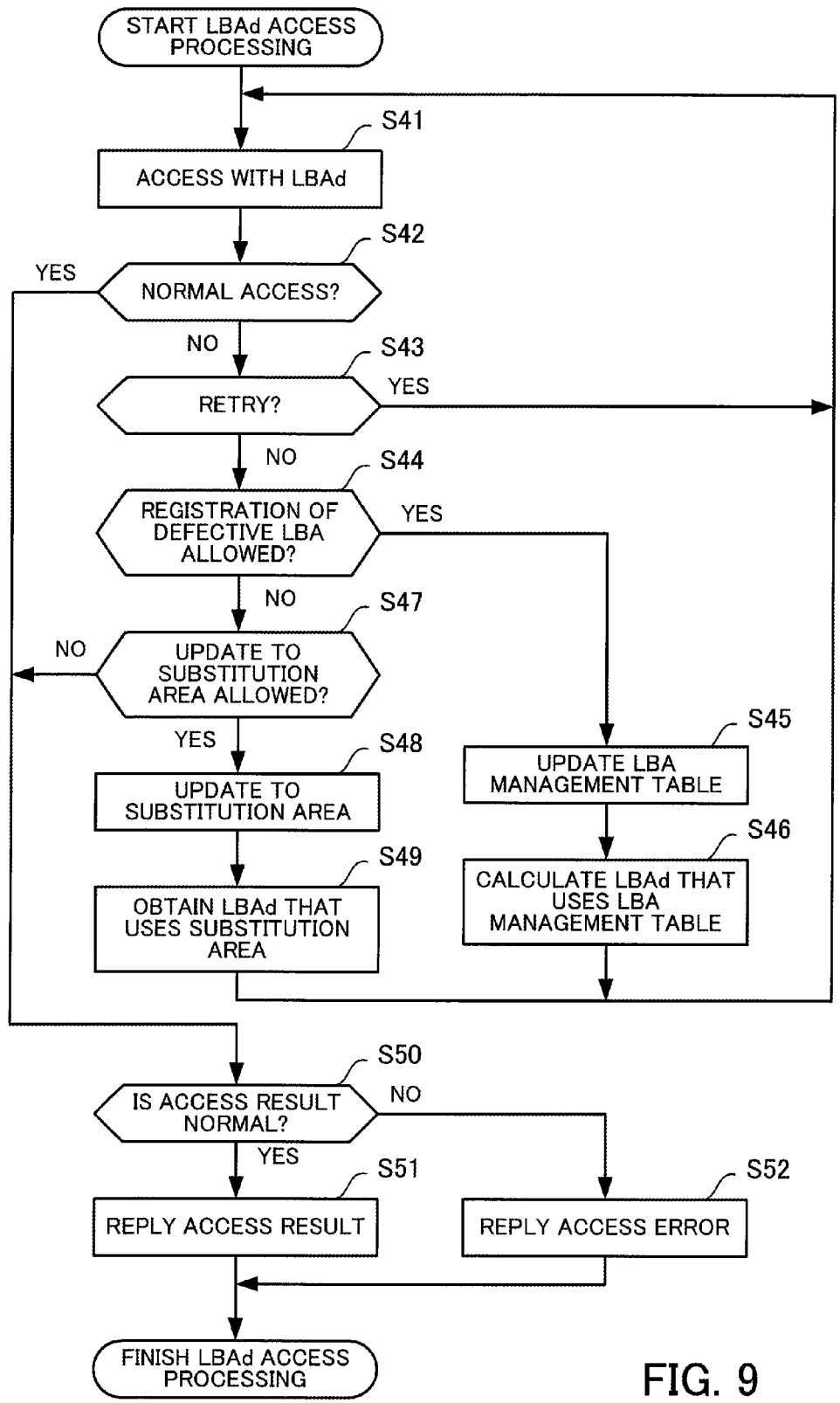
FIG. 9 is a flowchart of LBAd access processing of the second embodiment.

Next, the LBAd access processing executed by the controller 33 of the HBA 15 of the second embodiment is described using FIG. 9. FIG. 9 is a flowchart of the LBAd access processing of the second embodiment.

The LBAd access processing is an act of making access to LBAd in the HDD 17. The controller 33 executes the LBAd access processing in Step S34 of the LBAh access processing.

[Step S41] The controller 33 transmits LBAd to the HDD 17, and requests an access (reading of data, writing of data, or the like) to a storage area corresponding to the transmitted LBAd.

[Step S42] The controller 33 determines whether or not the result of accessing the HDD 17 using LBAd is normal. The controller 33 proceeds to Step S50 when the result of accessing the HDD 17 using LBAd is normal, and proceeds to Step S43 when the access result is not normal. The controller 33 may determine whether or not the result of accessing the HDD 17 using LBAd is normal, based on a response (e.g., a normal response, an access error response, or the like) from the HDD 17 via the HDD interface 32.

[Step S43] The controller 33 determines whether or not to execute a retry of the access to the HDD 17 using LBAd. The controller 33 proceeds to Step S41 when executing the retry of access to HDD 17 using LBAd, and proceeds to Step S44 when not executing the retry. For example, the determination of whether or not to execute the retry is performed by determining whether or not the number of times of retry has reached a specified number of times (e.g., five times).

[Step S44] Since the access to the HDD 17 using LBAd is not yet normally performed through retry, the controller 33 sets an LBA corresponding to an LBAd, with which the controller 33 failed in accessing the HDD 17, to a defective LBA. The controller 33 determines whether or not the defective LBA may be registered with the LBA management table 50. The controller 33 proceeds to Step S45 when the defective LBA may be registered with the LBA management table 50, and proceeds to Step S47 when the defective LBA is not allowed to be registered.

With regard to the determination of whether or not a defective LBA may be registered with the LBA management table 50, the registration may be allowed when an LBAd, with which the controller 33 failed in accessing the HDD 17, is not registered as a defective LBA with the LBA management table 50. Moreover, with regard to the determination of whether a defective LBA may be registered with the LBA management table 50, the registration may be allowed when the replacement count has not reached the skip parameter even though the LBAd, with which the controller 33 failed in accessing the HDD 17, is registered as a defective LBA.

[Step S45] The controller 33 updates the LBA management table 50. Specifically, when the LBAh corresponding to LBAd, with which the controller 33 failed in accessing the HDD 17, is not registered as a defective LBA, the controller 33 registers the LBAh as a defective LBA with the LBA management table 50 and also sets the replacement count to "1". When that LBAh corresponding to LBAd is already registered as a defective LBA, the controller 33 increments the replacement count of the defective LBA registered with the LBA management table 50.

[Step S46] The controller 33 re-calculates an LBAd corresponding to the defective LBA to be updated in the LBA management table 50, based on the information updated in Step S45. Thus, the LBAd corresponding to the defective LBA is updated to a replacement area. With regard to the defective LBA whose mapping with the LBAd has been updated, the flow proceeds to Step 41 to access using the LBAd again.

[Step S47] When an LBAd, with which the controller 33 failed in accessing the HDD 17, is not allowed to be registered as a defective LBA with the LBA management table 50 or when it is not allowed to be updated, the controller 33 determines whether or not the LBAd, with which the controller 33 failed in accessing the HDD 17, may be updated with a substitution area. The controller 33 proceeds to Step S48 when the LBAd, with which the controller 33 failed in accessing the HDD 17, is not allowed to be updated with a substitution area, and proceeds to Step S50 when the update is not allowed. For example, the cases where the LBAd, with which the controller 33 failed in accessing the HDD 17, is not allowed to be updated with a substitution area include a case where there is no substitution area or a case where the LBAd is not allowed to be updated with a substitution area due to another failure.

[Step S48] When an LBAd, with which the controller 33 failed in accessing the HDD 17, is not allowed to be registered as a defective LBA with the LBA management table 50 or when it is not allowed to be updated, the controller 33 updates the LBAd, with which the controller 33 failed in accessing the HDD 17, with a substitution area. Although the arrangement order of LBA's will not match the arrangement order of LBAd's corresponding to the LBA's due to the updating of the LBAd with the substitution area, the controller 33 may reduce the probability of the occurrence by increasing the skip parameter and securing a replacement area.

Note that, the controller 33 may record, onto the nonvolatile memory 35, substitution update information related to the fact that the LBAd is updated with a substitution area, and calculate an LBAd with reference to the substitution update information in Step S33 in the LBAh access processing.

[Step S49] The controller 33 obtains the LBAd that is updated to a substitution area. The controller 33 proceeds to Step S41, and performs an access again to the LBAd that is updated to a substitution area.

[Step S50] The controller 33 determines whether or not the result of accessing the HDD 17 using LBAd is normal. The controller 33 proceeds to Step S51 when the result of accessing the HDD 17 using LBAd is normal, and proceeds to Step S52 when the access result is not normal.

[Step S51] The controller 33 replies the result of accessing the HDD 17 using LBAd, and finishes the LBAd access processing. The access result, for example, is a completion report on the writing for writing to the HDD 17, and is read data for reading from the HDD 17.

[Step S52] The controller 33 replies an access error in accessing the HDD 17 using LBAd, and finishes the LBAd access processing. The controller 33 notifies the host 30 via the host interface 31 of this fact, and finishes the LBAd access processing.

Figure 10:
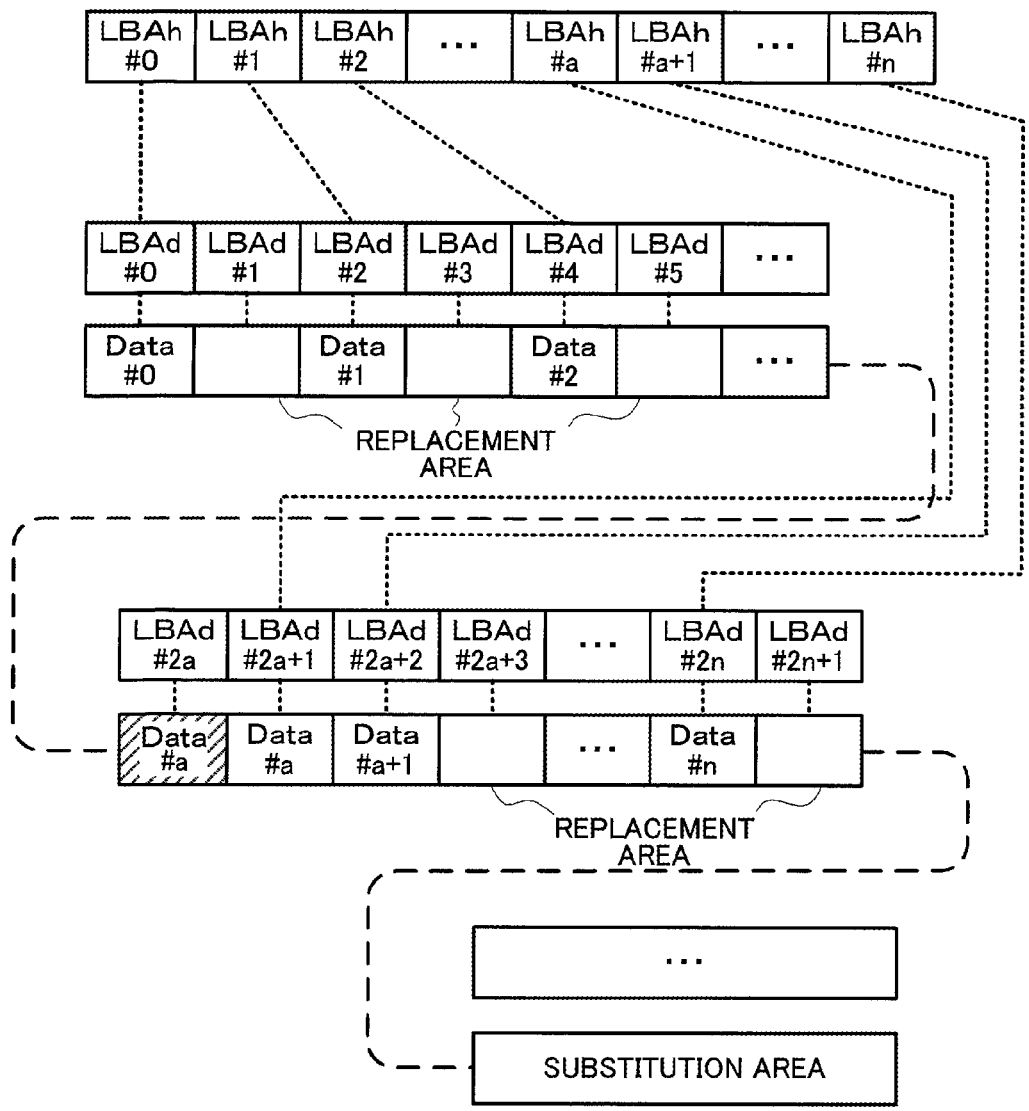
FIG. 10 illustrates an example of LBA rearrangement of the second embodiment.

Next, the mapping between LBAh and LBAd which is updated by the controller 33 of the HBA 15 of the second embodiment in the LBAd access processing when the skip parameter is "1" is described using FIG. 10. FIG. 10 illustrates an example of LBA rearrangement of the second embodiment.

The HDD 17 illustrated in FIG. 10 has a new mapping produced as result of an access failure due to, for example, a defect of LBAd#2a in the HDD 17 of FIG. 6. LBAh#a becomes a defective LBA because an access failure has occurred at LBAd#2a mapped to LBAh#a. The controller 33 sets LBAd#2a+1, which is the replacement area (see FIG. 6) of LBAd#2a, to the storage area of DATA#a. The controller 33 updates the mapping between LBAh#a and LBAd#2a to the mapping between LBAh#a and LBAd#2a+1.

Thus, even when LBAh#a is updated so as to have a new mapping with LBAd#2a+1, LBAd#2a+1 corresponding to LBAh#a is located between LBAd#2a-2 corresponding to LBAh#a-1 and LBAd#2a+2 corresponding to LBAh#a+1. Accordingly, even when such mapping of LBAh#a is updated, the arrangement order of LBAh's matches the arrangement order of LBAd's corresponding to the LBAh's. Accordingly, the HBA 15 may retain the sequential access characteristic with respect to the HDD 17.

Figure 11:
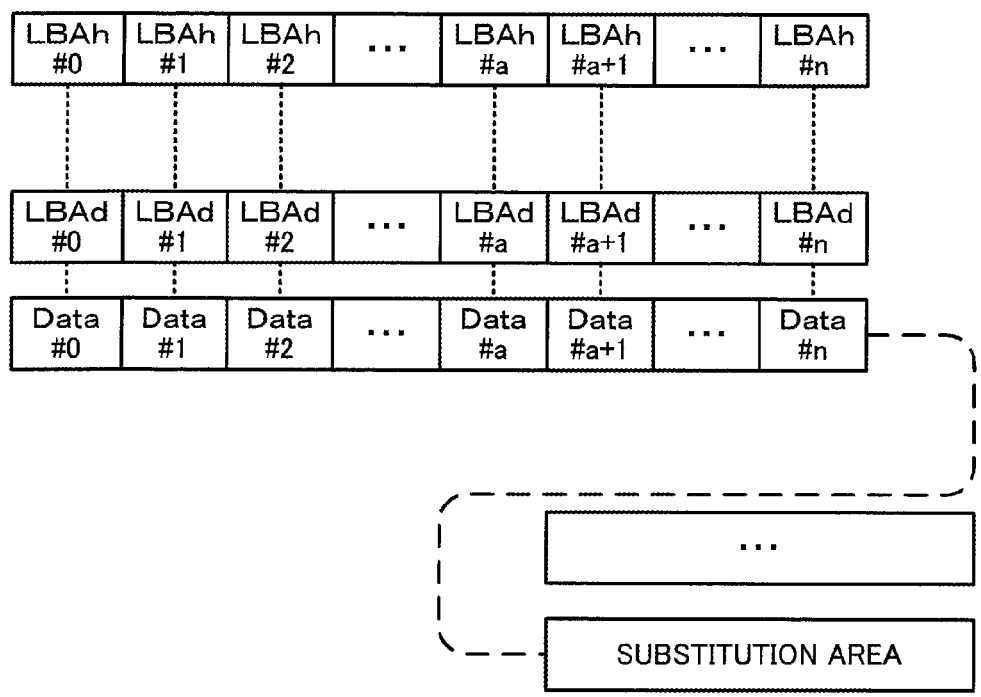
FIG. 11 illustrates an example of LBA arrangement of a reference embodiment.
Figure 12:
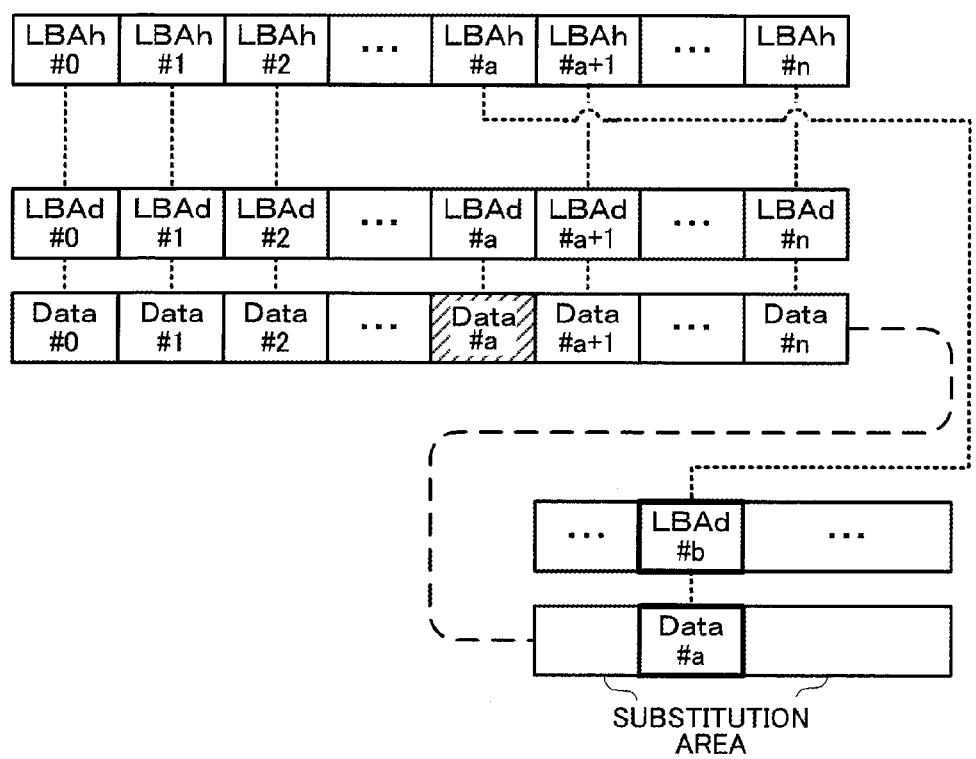
FIG. 12 illustrates an example of the LBA rearrangement of the reference embodiment.

Here, a case where a replacement area is not provided in the HDD 17 (when the skip parameter is "0") is described as a reference embodiment using FIG. 11 and FIG. 12. FIG. 11 illustrates an example of LBA arrangement of the reference embodiment. FIG. 12 illustrates an example of the LBA rearrangement of the reference embodiment.

When a replacement area is not provided in the HDD 17, the data areas are set as follows: Data#0, Data#1, ... Data#n, in the storage areas from LBAd#0 to LBAd#n.

LBAh#0 to LBAh#n continuously correspond to LBAd#0 to LBAd#n, such as LBAd#0 to LBAh#0 and LBAd#1 to LBAh#1. The arrangement order of LBAh#0 to LBA#n matches the arrangement order of LBAd#0 to LBAd#n. That is, when i is an integer from 0 to n, LBA#i corresponds to LBAd#i.

Thus, upon receipt of a request for access to continuous LBAh's from the host 30, the HBA 15 may perform an access, using LBAd, to the physical areas arranged in one direction with respect to the HDD 17.

The HDD 17 illustrated in FIG. 12 has a new mapping produced as a result of an access failure due to, for example, a defect of LBAd#a in the HDD 17 of FIG. 11. LBAh#a has been mapped to LBAd#a, but is now marked as a defective LBA because of the access failure at LBAd#a.

Because there is no replacement area of LBAd#a, the controller 33 sets a storage area of DATA#a in a substitution area (e.g., LBAd#b). Thus, LBAh#a is updated so as to have a new mapping with LBAd#b. Such updating of the mapping of LBAh#a causes a disagreement between the arrangement order of LBA's and the arrangement order of LBAd's corresponding to LBAh's. Therefore, when a replacement area is not provided in the HDD 17, the HBA 15 not able to retain the sequential access characteristic with respect to the HDD 17.

Accordingly, the HBA 15 sets the skip parameter of one or more and provides a replacement area in the HDD 17, so that even when a defective area is generated, the HBA 15 may retain the sequential access characteristic with respect to the HDD 17.

[Third Embodiment]

Figure 13:
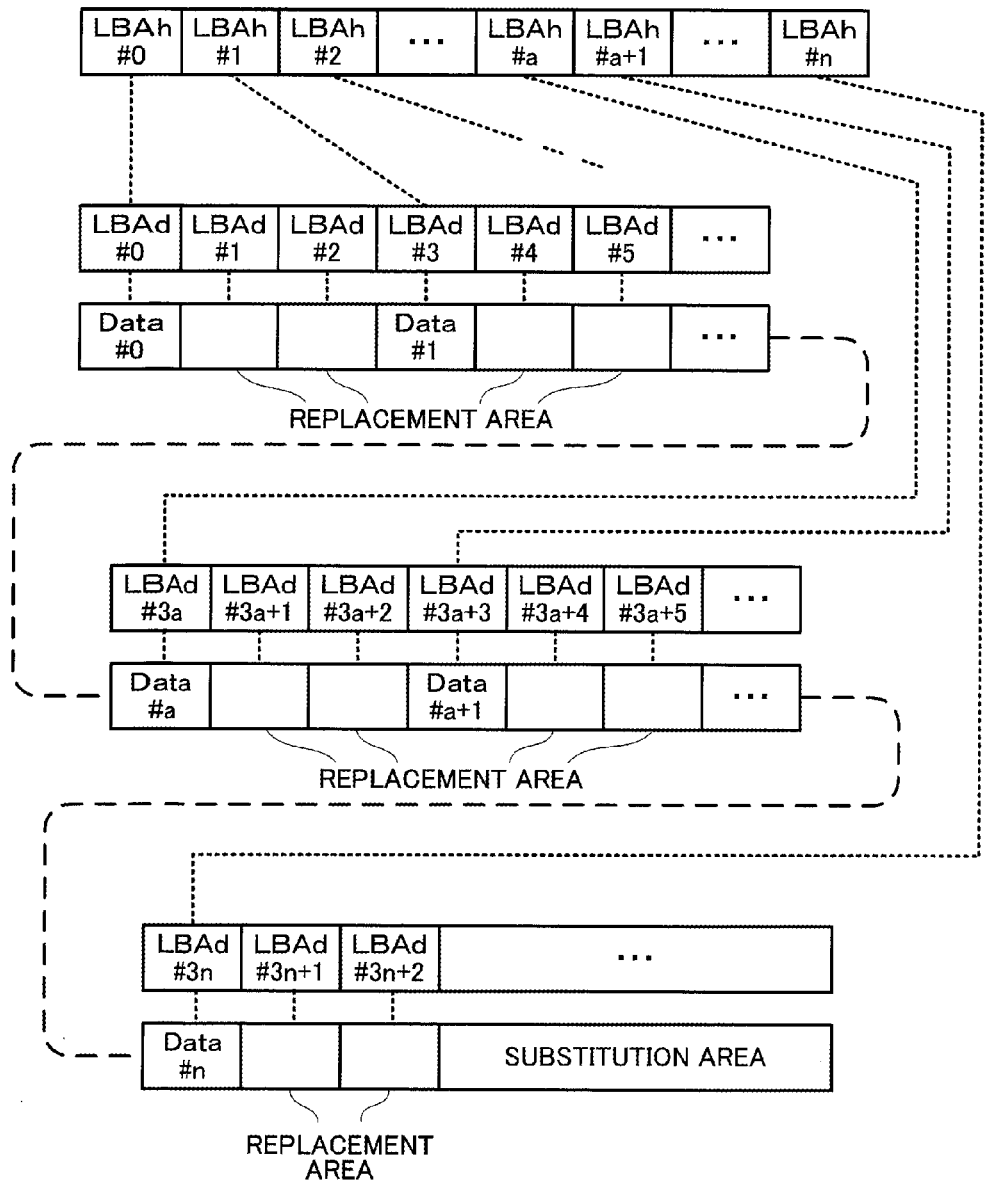
FIG. 13 illustrates an example of LBA arrangement of a third embodiment.
Figure 14:
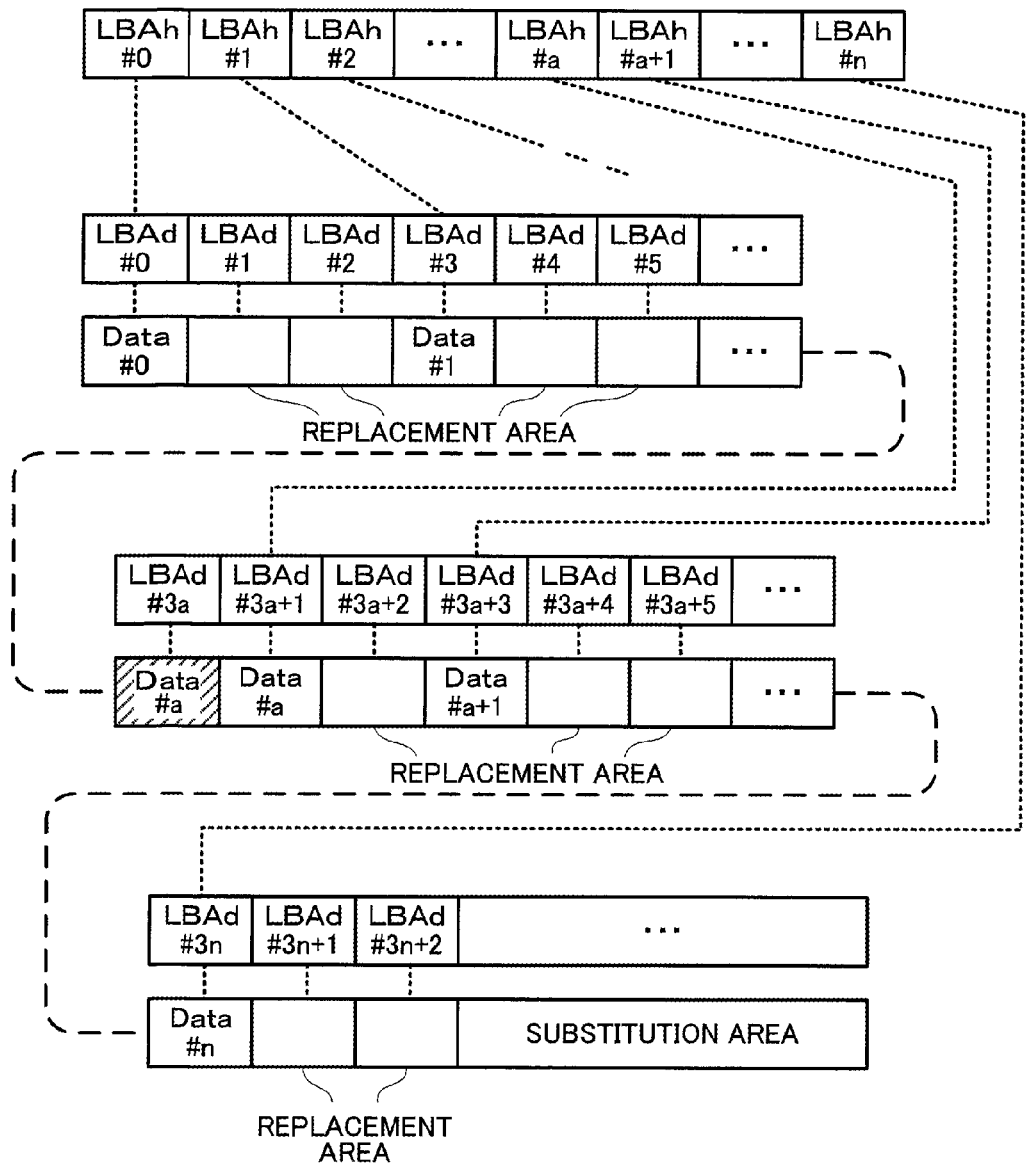
FIG. 14 illustrates an example of LBA rearrangement of the third embodiment.
Figure 15:
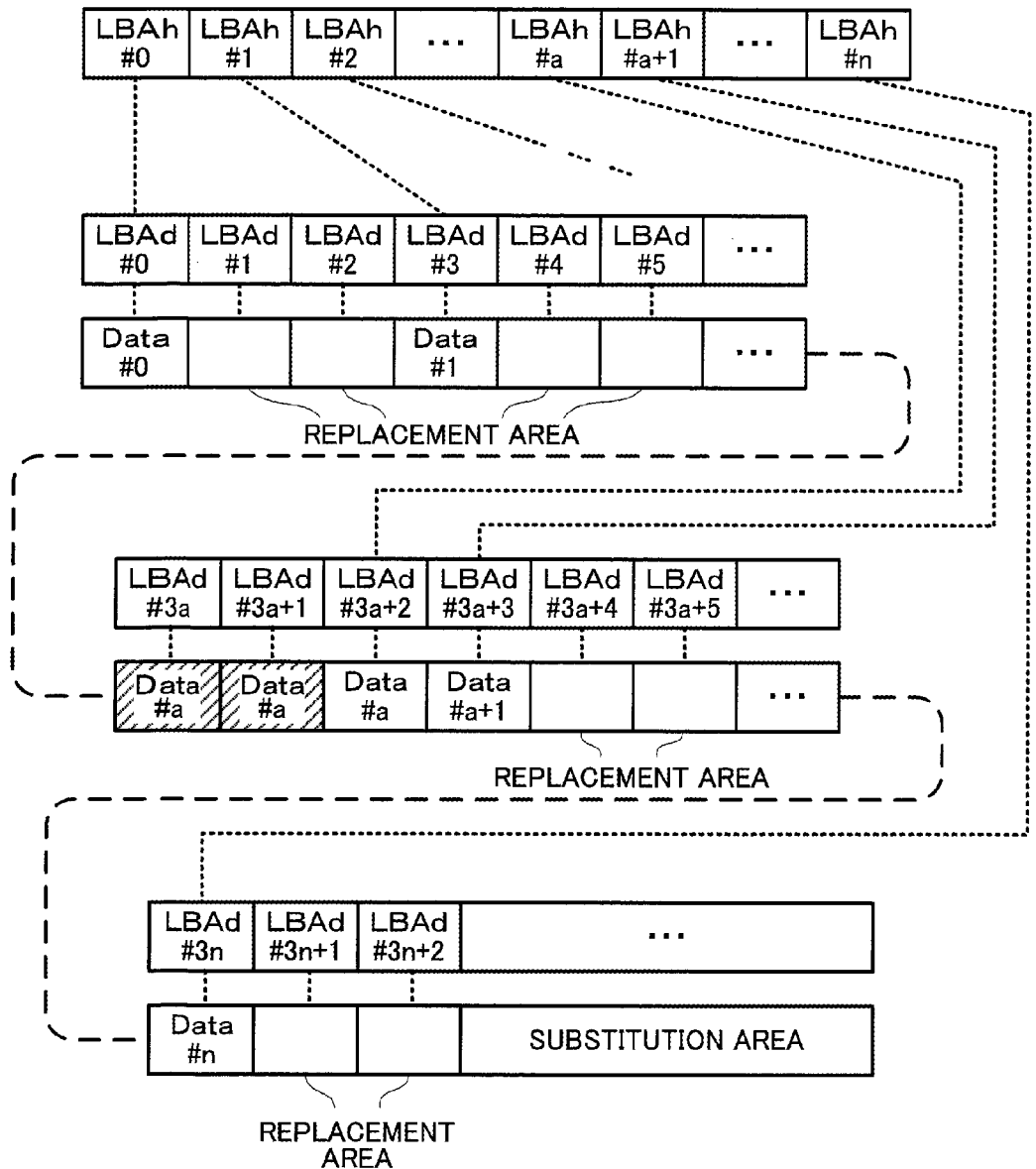
FIG. 15 illustrates an example of the LBA rearrangement of the third embodiment.

Next, another embodiment of mapping between LBAh and LBAd will be described with reference to FIG. 13 to FIG. 15. This mapping is generated by the controller 33 of the HBA 15 in the initialization processing with a skip parameter of "2" and updated in the LBAd access processing. FIG. 13 illustrates an example of LBA arrangement of the third embodiment. FIG. 14 and FIG. 15 illustrate an example of LBA rearrangement of the third embodiment.

The HDD 17 illustrated in FIG. 13 includes a non-illustrated management area, storage areas from LBAd#0 to LBAd#3n+2, and a needed substitution area. The mapping between LBAd and LBA in the HDD 17 illustrates a case when the skip parameter is "2".

Since the skip parameter is "2" in the storage areas from LBAd#0 to LBAd#3n+2, a Data area and two replacement areas are alternately set as follows: Data#0, a replacement area, a replacement area, Data#1, a replacement area, a replacement area, and so on.

LBAh#0 to LBAh#n correspond to LBAd#0 to LBAd#3n at every other two LBAd's, such as LBAd#0 to LBAh#0 and LBAd#3 to LBAh#1. The arrangement order of LBAh#0 to LBAh#n matches the arrangement order from LBAd#0 to LBAd#3n.

That is, when i is an integer from 0 to n, LBAh#i corresponds to LBAd#3i, and LBAd#3i+1 and LBAd#3i+2 not mapped to LBAh#i are replacement areas.

Thus, upon receipt of a request for access to continuous LBAh's from the host 30, the HBA 15 may perform access to the HDD 17 using the continuous LBAd's. Moreover, because the recording density of data decreases by alternately setting a Data area and a replacement area, the HDD 17 may reduce the risk of data loss caused by the occurrence of a defective sector or the like.

The HDD 17 illustrated in FIG. 14 has a new mapping produced as a result of an access failure due to, for example, a defect of LBAd#3a in the HDD 17 of FIG. 13. LBAh#a has been mapped to LBAd#3a, but is now marked as a defective LBA because of the access failure at LBAd#3a. The controller 33 sets LBAd#3a+1, which is the replacement area (see FIG. 13) of LBAd#3a, to the storage area of DATA#a. The controller 33 updates the mapping from between LBAh#a and LBAd#3a to between LBAh#a and LBAd#3a+1.

Thus, even when LBAh#a is updated so as to have a new mapping with LBAd#3a+1, LBAd#3a+1 corresponding to LBAh#a is located between LBAd#3a-3 corresponding to LBAh#a-1 and LBAd#3a+3 corresponding to LBAh#a+1. Accordingly, even when such mapping of LBAh#a is updated, the arrangement order of LBAh's matches the arrangement order of LBAd corresponding to the LBAh's. Accordingly, the HBA 15 may retain the sequential access characteristic with respect to the HDD 17.

The HDD 17 illustrated in FIG. 15 has a new mapping produced as a result of an access failure due to, for example, a defect of LBAd#3a+1 in the HDD 17 of FIG. 14. Although LBAh#a has previously been mapped to LBAd#3a+1 as a defective LBA, its replacement count is now changed from "1" to "2" because of the access failure at LBAd#3a+1. The controller 33 sets LBAd#3a+2, which is the replacement area (see FIG. 13) of LBAd#3a+1, as a new storage area of DATA#a. The controller 33 updates the mapping from between LBAh#a and LBAd#3a+1 to between LBAh#a and LBAd#3a+2.

Thus, even when LBAh#a is updated so as to have a new mapping with LBAd#3a+2, LBAd#3a+2 corresponding to LBAh#a is located between LBAd#3a-3 corresponding to LBAh#a-1 and LBAd#3a+3 corresponding to LBAh#a+1. In other words, the arrangement order of LBAh's still matches the arrangement order of LBAd's corresponding to the LBAh's. Accordingly, the HBA 15 may retain the sequential access characteristic with respect to the HDD 17.

By increasing the skip parameter, the HBA 15 may update the replacement area in accordance with the skip parameter and retain the sequential access characteristic with respect to the HDD 17 even when an access failure repeatedly occurs at LBAd corresponding to a defective LBA.

Note that, in the initialization processing with a skip parameter of "2", the HBA 15 has set storage areas for Data#i to LBAd#3i corresponding to LBAh#i. Then, the HBA 15 sets replacement areas on one side of LBAd#3i corresponding to LBAh#i. For example, the HBA 15 may set LBAd#3i+1 and LBAd#3i+2 as replacement areas, or may set LBAd#3i−2 and LBAd#3i−1 as replacement areas.

Alternatively, the HBA 15 may set replacement areas on both sides of LBAd#3i corresponding to LBAh#i. For example, the HBA 15 may set the storage area for storing Data#i to LBAd#3i corresponding to LBAh#i and set LBAd#3i−1 and LBAd#3i+1 as replacement areas.

Note that, the HBA 15 exclusively sets a replacement area corresponding to LBAh#i and a replacement area corresponding to LBAh#j (≠i), but may set a replacement area located between the storage area of LBAh#i and the storage area of LBAh#i+1 as a replacement area which may correspond to LBAh#i or LBAh#i+1. In this case, in a range where the arrangement order of LBAh's matches the arrangement order of LBAd's corresponding to the LBAh's, the HBA 15 allows a replacement area to be shared between LBAh#i and LBAh#i+1. Note that, the HBA 15 may prevent collision by uniquely determining a replacement area to be replaced in accordance with the replacement count, which the LBA management table 50 retains, and by referring to the replacement counts of defective LBAh's surrounding the defective LBA in question.

The HBA 15 may achieve an increase in the storage area available to a user by such sharing of a replacement area, while retaining the sequential access characteristic by securing a replacement area.

[Fourth Embodiment]

Figure 16:
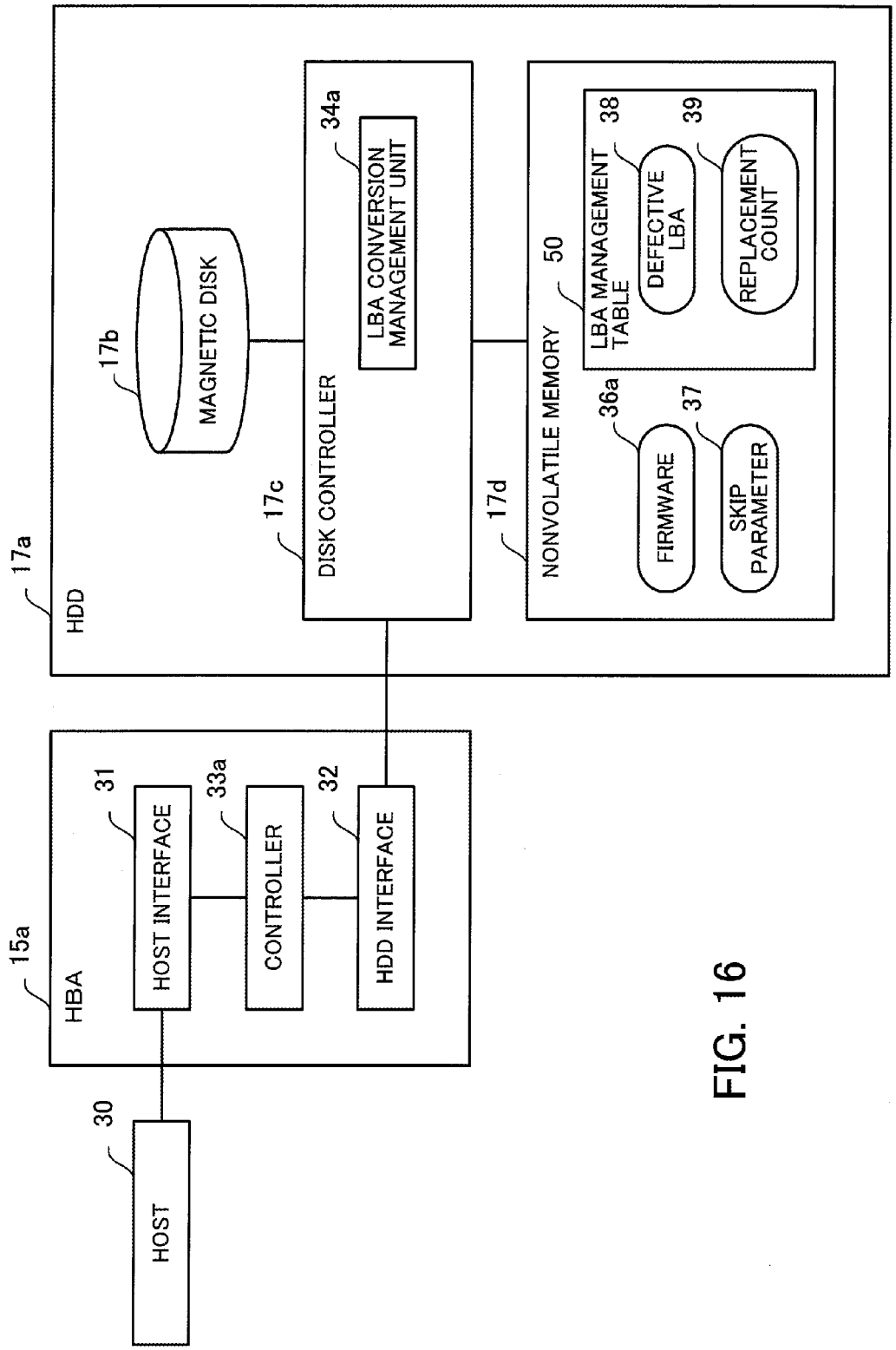
FIG. 16 illustrates a configuration example of an information processing apparatus of a fourth embodiment.

Next, an HDD of a fourth embodiment is described using FIG. 16. FIG. 16 illustrates a configuration example of an information processing apparatus of the fourth embodiment.

The fourth embodiment differs from the second embodiment, which performs the LBA conversion by the HBA 15, in that the LBA conversion is performed by an HDD 17a.

The HDD 17a is an information storage device and also an example of the information processing apparatus. The HDD 17a receives an access to the HDD 17a made by the host 30, via an HBA 15a.

The HBA 15a mediates the access to the HDD 17 made by the host 30. The HBA 15a includes the host interface 31, the HDD interface 32, and a controller 33a. The host interface 31 provides a hardware interface and software interface for connecting the HBA 15a and the host 30. The HDD interface 32 provides a hardware interface and software interface for connecting the HBA 15a and the HDD 17a. The controller 33a controls the information processing between the host interface 31 and the HDD interface 32.

Unlike the controller 33 of the second embodiment, the controller 33a transmits LBAh specified by the host 30 to the HDD 17a without converting the LBAh. Therefore, in the description below, assume that LBAh is transmitted to the HDD 17a from the HBA 15a.

The HDD 17a includes a magnetic disk 17b, a disk controller 17c, and a nonvolatile memory 17d. The magnetic disk 17b is an information storage medium for recording information, and is controlled by the disk controller 17c.

The disk controller 17c includes an LBA conversion management unit 34a. The nonvolatile memory 17d stores firmware 36a, a skip parameter 37, and a LBA management table 50. Each entry of the LBA management table 50 retains a defective LBA 38 and its replacement count 39.

The disk controller 17c includes a non-illustrated CPU and integrally controls the HDD 17a. Upon receipt of an access request using LBA from the HBA 15a, the disk controller 17c executes the firmware 36a using LBAd, thereby realizing the mutual conversion between LBAh and LBAd according to a procedure similar to the procedure of the controller 33 of the second embodiment.

The disk controller 17c performs the mutual conversion between LBAh and LBAd with reference to the LBA management table 50. The LBA conversion management unit 34a generates and updates the LBA management table 50. The LBA conversion management unit 34a generates the LBA management table 50 in the initialization processing, and updates the LBA management table 50 upon detection of an access failure in the HDD 17b.

Note that the above-described processing functions may be implemented on a computer. In that case, a computer program is provided which describes contents of the functions to be included in each of the information processing apparatus 1, 10, the HBA 15, and the HDD 17a. A computer executes those programs, thereby realizing the above-described processing functions on the computer. The programs describing the processing contents may be stored in a computer-readable medium. Such computer-readable media include a magnetic storage device, an optical disc, magneto-optical storage media, a semiconductor memory, and the like. The examples of the magnetic storage device include a hard disk drive unit (HDD), a flexible disk (FD), and a magnetic tape. The examples of the optical disc include DVD, a DVD-RAM, a CD-ROM/RW. The examples of the magneto-optical storage medium include an MO (Magneto-Optical disk).

For the purpose of distributing computer programs, portable storage medium, such as DVD and CD-ROM, having the programs recorded thereon is made available for sale. It is also possible to store the computer programs in a storage device of a server computer and transfer the programs to other computers from the server computer through the network.

A computer executing a program installs programs recorded on a portable storage medium or transferred from a server computer in a storage device of the computer. The computer then reads the programs from the storage device of the computer and executes processing in accordance with the programs. Where appropriate, the computer may directly read the programs from the portable storage medium and execute processing in accordance with the programs. The computer may also execute processing in accordance with received programs each time the programs are transferred from the server computer connected through the network.

Moreover, at least some of the above-described processing functions may be realized with an electronic circuit, such as DSP (Digital Signal Processor), ASIC (Application Specific Integrated Circuit), or PLD (Programmable Logic Device).

According to an aspect of the embodiments disclosed herein, the proposed information processing apparatus, information processing program, and access control method retain the continuity of sequential access even when the mapping between a logical address and a physical address is changed due to a physical defect in storage media.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. An information processing apparatus comprising:
a memory configured to store information about mapping between a continuous series of logical addresses and discrete physical addresses spaced with a predetermined number of spare physical addresses therebetween in a storage medium, the logical addresses and the discrete physical addresses having a one-to-one correspondence;
one or more processors configured to perform a procedure including:
identifying a logical address corresponding to a physical address of a defective area found in the storage medium, and shifting the mapping of the identified logical address to an alternative physical address adjacent to the physical address of the defective area, the alternative physical address being one of the spare physical addresses;
and controlling access to a storage area at a physical address corresponding to a specified logical address, based on the stored information about the mapping;
wherein the memory stores a number of times the shifting has been performed on the mapping of the identified logical address, and the controlling includes:
calculating, when the specified logical address is not a defective logical address, the physical address corresponding to the specified logical address, based on the number of times of the shifting, and
calculating, when the specified logical address is a defective logical address, the physical address corresponding to the specified logical address, based on a multiplication value of the specified logical address and the number of times the shifting has been performed.

2. The information processing apparatus according to claim 1, wherein:
the procedure further includes retaining the identified logical address as a defective logical address, and
the controlling includes calculating, when the specified logical address is the defective logical address, the physical address corresponding to the specified logical address, based on a shift amount of the shifting performed on the mapping of the defective logical address.

3. The information processing apparatus according to claim 1, wherein the controlling includes calculating the physical address corresponding to the specified logical address, based on the predetermined number.

4. The information processing apparatus according to claim 1, wherein the shifting is repeatedly executed within a limit given by the predetermined number.

5. The information processing apparatus according to claim 4, wherein:
the memory stores a number of times the shifting has been performed on the mapping of the identified logical address, and
the controlling includes calculating, when the specified logical address is a defective logical address, the physical address corresponding to the specified logical address, based on the number of times of the shifting.

6. The information processing apparatus according to claim 1, wherein:
the discrete physical addresses are located at predetermined intervals each including the predetermined number of spare physical addresses,
each of the predetermined intervals contains a first spare physical address located at one end of the interval and one or more second spare physical addresses adjacent to the first spare physical address, the first spare physical address being mapped to a logical address, and
the procedure further includes reserving the one or more second spare physical addresses for replacement of the first spare physical address when the first spare physical address is found to be of a defective area.

7. A computer-readable storage medium storing an information processing program, the information processing program causing a computer to perform a procedure comprising:
managing information about mapping between a continuous series of logical addresses and discrete physical addresses spaced with a predetermined number of spare physical addresses therebetween in a storage medium, the logical addresses and the discrete physical addresses having a one-to-one correspondence;
identifying a logical address corresponding to a physical address of a defective area found in the storage medium, and shifting the mapping of the identified logical address to an alternative physical address adjacent to the physical address of the defective area, the alternative physical address being one of the spare physical addresses;
and controlling access to a storage area at a physical address corresponding to a specified logical address, based on the information about the mapping;
storing a number of times the shifting has been performed on the mapping of the identified logical address, and the controlling includes:
calculating, when the specified logical address is not a defective logical address, the physical address corresponding to the specified logical address, based on the number of times of the shifting, and
calculating, when the specified logical address is a defective logical address, the physical address corresponding to the specified logical address, based on a multiplication value of the specified logical address and the number of times the shifting has been performed.

8. The computer-readable storage medium according to claim 7, wherein:
the procedure further comprises retaining the identified logical address as a defective logical address, and
the controlling includes calculating, when the specified logical address is the defective logical address, the physical address corresponding to the specified logical address, based on a shift amount of the shifting performed on the mapping of the defective logical address.

9. The computer-readable storage medium according to claim 7, the controlling includes calculating the physical address corresponding to the specified logical address, based on the predetermined number.

10. The computer-readable storage medium according to claim 7, wherein the shifting is repeatedly executed within a limit given by the predetermined number.

11. The computer-readable storage medium according to claim 10, wherein:
the procedure further comprises recording a number of times the shifting has been performed on the mapping of the identified logical address, and
the controlling includes calculating, when the specified logical address is a defective logical address, the physical address corresponding to the specified logical address, based on the number of times of the shifting.

12. The computer-readable storage medium according to claim 7, wherein:
- the discrete physical address are located at predetermined intervals, each including the predetermined number of spare physical addresses,
- each of the predetermined intervals contains a first spare physical address located at one end of the interval and one or more second spare physical addresses adjacent to the first spare physical address, the first spare physical address being mapped to a logical address, and
- the procedure further comprises reserving the one or more second spare physical storage addresses for replacement of the first spare physical address when the first spare physical address is found to be of a defective area;
- the procedure further comprises storing a number of times the shifting has been performed on the mapping of the identified logical address, and the controlling includes:
  - calculating, when the specified logical address is not a defective logical address, the physical address corresponding to the specified logical address, based on the number of times of the shifting, and
  - calculating, when the specified logical address is a defective logical address, the physical address corresponding to the specified logical address, based on a multiplication value of the specified logical address and the number of times the shifting has been performed.

13. An access control method comprising:
- managing, by a computer, information about mapping between a continuous series of logical addresses and discrete physical addresses spaced with a predetermined number of spare physical addresses therebetween in a storage medium, the logical addresses and the discrete physical addresses having a one-to-one correspondence:
- identifying, by the computer, a logical address corresponding to a physical address of a defective area found in the storage medium, and shifting, by the computer, the mapping of the identified logical address to an alternative physical address adjacent to the physical address of the defective area, the alternative physical address being one of the spare physical addresses: and
- controlling, by the computer, access to a storage area at a physical address corresponding to a specified logical address, based on the information about the mapping;
- storing a number of times the shifting has been performed on the mapping of the identified logical address, and the controlling includes:
  - calculating, when the specified logical address is not a defective logical address, the physical address corresponding to the specified logical address, based on the number of times of the shifting, and
  - calculating, when the specified logical address is a defective logical address, the physical address corresponding to the specified logical address, based on a multiplication value of the specified logical address and the number of times the shifting has been performed.

14. The access control method according to claim 13, further comprising:
- retaining, by the computer, the identified logical address as a defective logical address; and
- the controlling includes calculating, when the specified logical address is the defective logical address, the physical address corresponding to the specified logical address based on a shift amount of the shifting performed on the mapping of the defective logical address.

15. The access control method according to claim 13, wherein the controlling includes calculating, by the computer, the physical address corresponding to the specified logical address, based on the predetermined number.

16. The access control method according to claim 13, wherein the shifting is repeatedly executed within a limit given by the predetermined number.

17. The access control method according to claim 16, wherein:
- the method further comprises retaining, by the computer, a number of times the shifting has been performed on the mapping of the identified logical address; and
- the controlling includes calculating, when the specified logical address is a defective logical address, the physical address corresponding to the specified logical address, based on the number of times of the shifting.

18. The access control method according to claim 13, wherein:
- the discrete physical address are located at predetermined intervals each including the predetermined number of spare physical addresses,
- each of the predetermined intervals contains a first spare physical address located at one end of the interval and one or more second spare physical addresses adjacent to the first physical address, the first spare physical address being mapped to a logical address, and
- the method further comprises reserving, by the computer, the one or more second spare physical addresses for replacement of the first spare physical address when the first spare physical address is found to be of a defective area.

* * * * *